United States Patent [19]

Thomas

[11] Patent Number: 5,217,242
[45] Date of Patent: Jun. 8, 1993

[54] ADJUSTABLE LENGTH DRAWBAR ASSEMBLY

[75] Inventor: Bernd Thomas, Hassloch, Fed. Rep. of Germany

[73] Assignee: Deere & Company, Moline, Ill.

[21] Appl. No.: 932,467

[22] Filed: Aug. 20, 1992

[30] Foreign Application Priority Data

Aug. 23, 1991 [DE] Fed. Rep. of Germany ....... 4127933

[51] Int. Cl.$^5$ .............................................. B60D 1/42
[52] U.S. Cl. .................. 280/482; 280/491.2
[58] Field of Search .............................. 280/482, 491.2

[56] References Cited

U.S. PATENT DOCUMENTS

| | | | |
|---|---|---|---|
| 2,873,982 | 2/1959 | Graham | 280/482 |
| 3,014,738 | 12/1961 | Kasten | 280/482 |
| 3,169,782 | 2/1965 | Columbus | 280/482 |
| 3,292,950 | 12/1966 | Kirkpatrick | 280/482 |
| 4,169,611 | 10/1979 | Smith et al. | 280/482 |

FOREIGN PATENT DOCUMENTS

| | | |
|---|---|---|
| 492300 | 3/1930 | Fed. Rep. of Germany . |
| 1249707 | 4/1963 | Fed. Rep. of Germany . |
| 8707808.2 | 8/1988 | Fed. Rep. of Germany . |
| 2208583 | 4/1989 | United Kingdom . |

*Primary Examiner*—Margaret A. Focarino
*Assistant Examiner*—Carla Mattix

[57] ABSTRACT

An adjustable length drawbar assembly includes a cage which is pivotally attached to the rear of a vehicle and a drawbar which slides in the cage. A plurality of spaced apart bores extending laterally through the drawbar. A pair of claws are mounted to a selected one of the bores by a pin and springs bias the claws towards the drawbar. A pair of recesses are formed at the rear end of the cage adjacent to a pair of ramp surfaces. The claws are spread apart as they slide over the ramp surfaces, and the claws have tabs which are received by the recesses to releasably lock the drawbar into the desired position with respect to the cage. The claws may be pulled away from each other and out of the recesses, and then rotated on the pins 90° to disable the locking mechanism.

10 Claims, 1 Drawing Sheet

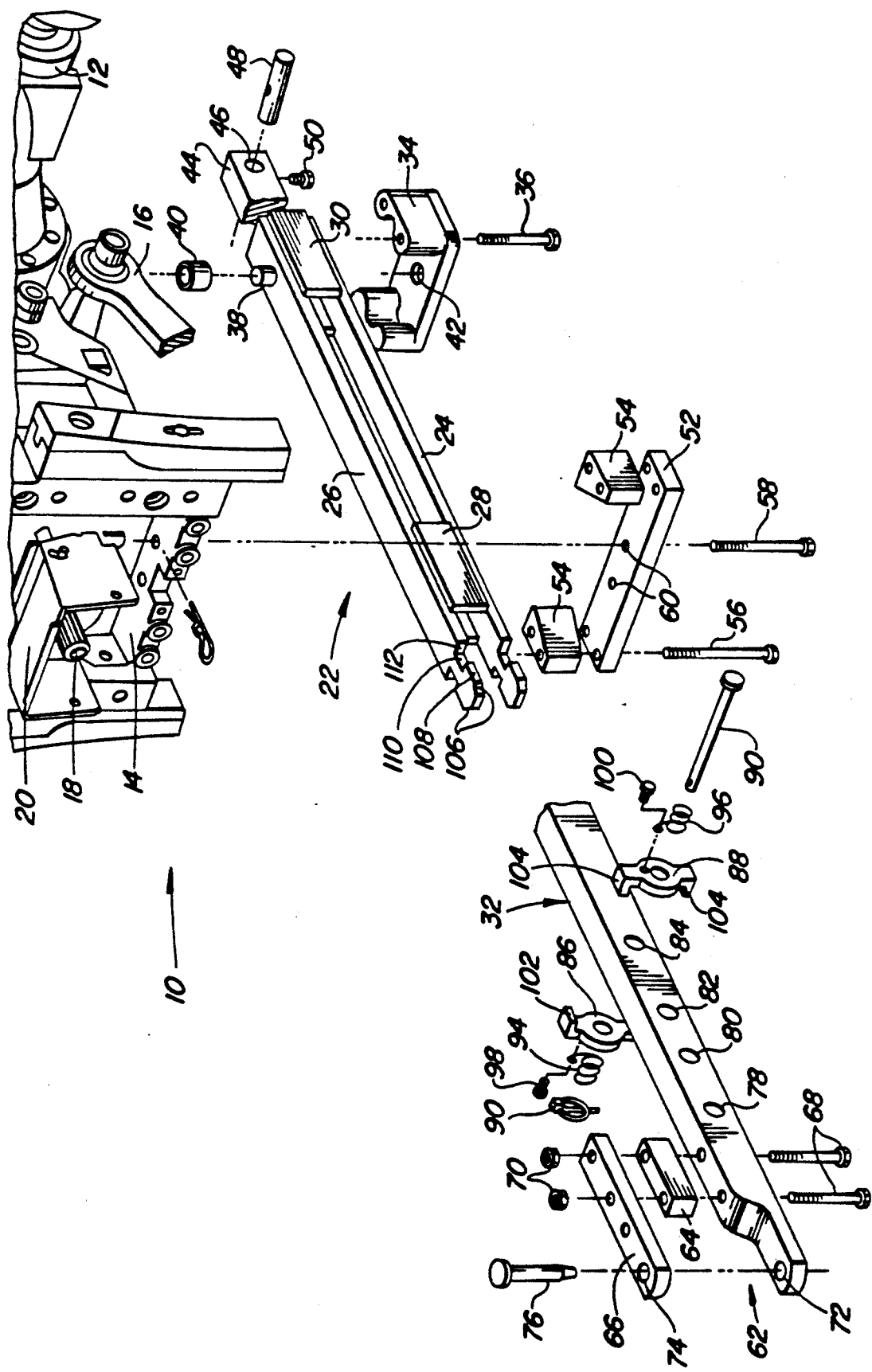

ADJUSTABLE LENGTH DRAWBAR ASSEMBLY

BACKGROUND OF THE INVENTION

The invention relates to a drawbar arrangement by which a drawn implement is coupled to a vehicle such as an agricultural tractor or utility vehicle, and more particularly, to a drawbar which has an adjustable length. It is well known to pivotally mount a drawbar at the rear of a tractor so that implements, such as a trailer or a mower can be coupled to the tractor. For example, a pivoted drawbar is shown in DE-PS-492 300. This pivoted drawbar is provided with spaced apart bores which can be aligned selectively with bores in transverse straps that are attached to the vehicle chassis. The length to which this pivoted drawbar extends beyond the rear end of the vehicle can be selected by inserting a locking pin through the aligned bores.

This type of adjustable length drawbar cannot be used in many cases due to the extent of the longitudinal supports and transverse straps. For example, the rear region of an agricultural tractor is occupied generally by a multitude of towing, mounting and hitch structures which limit the available space. In the design shown in DE-PS-492 300 the longitudinal supports and transverse straps restrict or make impossible the operation of the towing and mounting arrangements.

In many agricultural tractors an adjustable length pivoted drawbar is provided in order to comply with the requirements of various coupled implements. This is necessary since the distance between the coupling point and the end of the power take-off shaft may be different for the different implements that can be coupled to the tractor. The differing operating lengths are standardized by ISO or SAE.

Due to the limited space available it is common practice to attach the pivoted drawbar to the vehicle from underneath, for example, to the differential housing. If the distance between the coupling point and the end of a power take-off shaft is changed, then the operator must adjust the drawbar from the underside of the tractor. This may be accomplished by releasing a locking pin and moving the pivoted drawbar into the desired position and then manually securing the desired operating length by inserting the locking pin into an appropriate hole in the pivoted drawbar. This work is uncomfortable and requires a relatively large amount of time. The coupling process, in which the operator backs the tractor to the implement to be coupled, is difficult if the coupling point of the pivoted drawbar is very close to the rear of the tractor and cannot be visually inspected from the operator's seat.

SUMMARY OF THE INVENTION

Accordingly, an object of this invention is to provide a drawbar of the aforementioned type which can overcome the problems noted and which can be easily adjusted.

A further object of the invention is to provide such a drawbar which has coupling point which is easily visible from the operator's seat during the coupling process.

A further object of the invention is to provide such a drawbar which has locking means which is operable automatically as the drawbar is moved lengthwise to its desired position.

These and other objects are achieved by the present invention wherein an adjustable length drawbar assembly includes a cage which is pivotally attached to the rear of a vehicle and a drawbar which slides in the cage. A plurality of spaced apart bores extend laterally through the drawbar. A pair of claws are mounted to a selected one of the bores by a pin and a pair of springs urge the claws towards the drawbar. A pair of recesses are formed at the rear end of the cage adjacent to a pair of ramp surfaces. The claws are spread apart as they slide over the ramp surfaces, and the claws have tabs which are received by the recesses to releasably lock the drawbar into the desired position with respect to the cage. The claws may be pulled away from each other and out of the recesses, and then rotated on the pins 90° to disable the locking mechanism.

BRIEF DESCRIPTION OF THE DRAWINGS

The single FIGURE is a perspective view that shows in its upper area a partial view of the rear of a tractor and shows a adjustable length drawbar assembly according to the present invention.

DETAILED DESCRIPTION

Referring now to the single FIGURE, there is shown a partial view of the rear of a tractor 10 with axle housing 12, gearbox housing 14, lower steering arms 16, power take-off shaft stub 18 and power take-off shaft protective casing 20. A cage 22 is positioned below the rear of the tractor 10 and includes a lower bracket 24, an upper bracket 26 and four connecting links 28, 30. The links 28, 30 are welded in the rear and front region to the lower and upper bracket 24, 26, resulting in a largely open cage into which the drawbar 32 can be inserted to slide in its longitudinal direction. The largely open configuration avoids problems of dirt accumulation.

The front end of the cage 22 is supported by a generally U-shaped support 34 which can be attached to the lower part of the gearbox housing 14 by four bolts 36, of which only one is shown. In this region the cage 22 carries a pin or shank 38 which extends vertically, and which engages corresponding recesses in the gearbox housing 14 and in the support 34 and thereby provides a pivot axis about which the cage 22 may pivot. The recess in the gearbox housing 14 is formed by a sleeve 40 which is press fitted into the gearbox housing 14. The other recess 42 is formed in the base strap of the U-shaped support 34.

The rear part of the cage 22 is supported by a support 52 which permits sideways pivoting of the cage. The support 52 is attached to the underside of the gearbox housing 14 with spacers 54 by four bolts 56, only one of which is shown. The spacers 54 are simultaneously used as stops which limit sideways pivoting of the cage 22. For a closer limitation of the sideways movement of the cage 22, two further bolts 58, of which only one is shown, can be inserted into intermediate bores 60 in the support 52 and screwed into the gearbox housing 14.

The drawbar 32 is shown in the drawing broken along a line aligned with the cage 22. The front part 44 of the drawbar 32 is provided with a laterally extending bore 46 into which a stop pin 48 can be inserted and which protrudes to both sides. To secure the stop pin 48, a bolt 50 can be inserted from below through a bore in the front part 44 of the drawbar 32 and can be screwed into a threaded hole in the stop pin 48. The stop pin 48 prevents the drawbar 32 from being pulled out of the cage 22 towards the rear of the vehicle. This means that the drawbar 32 can be extended to the rear only up to a maximum length.

The main part of the drawbar 32 carries at its rear end a coupling socket 62. To form the coupling socket 62, a spacer 64 and a bracket 66 are attached to the rear end of the drawbar 32 with two bolts 68 and nuts 70. In order to couple to the coupling eye (not shown) of an implement to be towed (not shown), the coupling eye (not shown) is brought into the region of the coupling socket 62 and secured there with a pin 76 that can be inserted through vertical bores 72, 74.

The drawbar 32 is provided with four horizontal laterally extending bores 78, 80, 82 and 84. The plurality of bores 78, 80, 82 and 84 correspond to the different desired operating lengths, which preferably are prescribed by standards. Locking claws 86, 88 can be mounted at one of the bores 78, 80, 82, 84. The claws 86, 88 are attached to both sides of the drawbar 32 by a pin 90 which is inserted through a central bore in each of the claws 86, 88 and a selected one of the bores 78, 80, 82, 84. The pin 90 can be secured by a snap-on plug 92.

In the assembled condition, springs 94, 96 force the claws 86, 88 against the drawbar 32, but the claws may be forced away from the drawbar 32 by hand. Each of the springs 94, 96 is provided with a loop which is used to fasten it to the associated claw 86, 88 with a bolt 98, 100. This attachment simplifies the assembly of the locking means since the springs 94, 96 are securely connected to the claws 86, 88.

Each of the claws 86, 88 is provided with upper and lower tabs 102, 104 which project from the claws 86, 88 towards the drawbar 32. The springs 94, 96 are biassed to urge the claws 86, 88 towards each other and against the side surfaces of the drawbar 32.

The rearward ends of the upper and lower cage brackets 24, 26 are each provided with inclined ramps 106. The ramps 106 blend into parallel surfaces 108 which terminate at rectangular grooves 110 which extend laterally into both sides of the brackets 24, 26. The brackets 24, 26 are narrower in the region of surfaces 108 than in the main body thereof on the other side of the grooves 110, so that shoulders 112 at the forward end of the grooves 110 forms stop surfaces.

MODE OF OPERATION

The length of the drawbar 32 may be adjusted as follows. Initially, the drawbar 32 is pulled out of the cage 22 until the stop pin 48 engages the front end of the cage 22 and limits further movement. With the drawbar 32 pulled out to its maximum, the coupling point at the coupling socket 62 is observable without any difficulty from the operator's cab. Now the desired operating length of the drawbar 32 is determined and the claws 86, 88 are secured with the pin 90 to the desired one of the bores 78, 80, 82, 84. To readjust the claws 86, 88, the snap-on plug 92 is removed from the pin 90, the pin 90 is removed from the spring 94, from the claw 86 and from the selected one the bores 78, 80, 82, 84. The claws 86, 88 are then reattached to the drawbar 32 at another one of the bores 78, 80, 82, 84.

The drawbar 32 may be pulled out of the cage 22 without resetting its length by pulling the two claws 86, 88 apart against the force of the spring 94 with both hands to thereby bring them out of the grooves 110 to release the lock, and by simultaneously pulling the two claws 86, 88 and the drawbar 32 to the rear. Alternatively, one of the claws 86, 88 may be pulled away from the drawbar 32 against the force of the spring 94 and then rotated 90° to bring its tab 104 to rest on the side surface of the drawbar 32. The same is then done to the other claw 88. This releases the locking mechanism so that the drawbar 32 may be adjusted lengthwise at a later time.

After setting a position for the drawbar 32, the operator can back up the vehicle while observing the coupling point, until the coupling socket 62 is brought into alignment with the coupling eye of the implement to be coupled, to enable coupling by inserting the pin 76. By backing the tractor further, the drawbar 32 will be pushed into the cage 22 until the ramps 106 will engage the tabs 102, 104 and move the claws 86, 88 away from each other against the force of the springs 94, 96. When the tabs 102, 104 reach the grooves 110, the claws 86, 88 will move towards each other and the tabs 102, 104 will move into the grooves 110 due to the force of the springs 94, 96. If the tabs 102, 104 do not snap into the grooves 110 rapidly enough, the tabs 102, 104 engage the stops 112 and further movement of the drawbar 32 into the cage 22 is stopped.

The claws 86, 88 can be retracted by hand against the spring force and rotated 90° from the position shown in the FIGURE. If the claws 86, 88 are then released, they will be supported on the side surfaces of the drawbar 32 by their tabs 102, 104 and the claws will not perform their locking function.

In order to securely hold the claws 86, 88 in the grooves 110, it may be appropriate and even required for safety reasons, to lock or latch the claws 86, 88 in place and prevent them from disengaging from the grooves 110. This can be accomplished by an additional snap-on plug, not shown, or a clamping arrangement or the like.

Thus, the drawbar of this invention may be initially pulled out beyond the rear of the tractor so that it is easily visible from the operator's seat. Then the claws are attached to the drawbar in a position that corresponds to a desired operating length. The operator can now take his seat and back the tractor towards the implement to be coupled while observing the coupling point. After the drawbar is coupled, the tractor is backed further until the claws automatically lock into the recesses in the cage. Now the drawbar has the desired operating length. If necessary, the claws can be unloaded by inserting a safety locking pin or another added positive locking device (not shown).

The drawbar of this invention may be handled easily and quickly coupled to implements, and its operating length may be easily adjusted to set the desired distance between the coupling point and the end of the power take-off shaft for different implements. The operator can comfortably perform the adjustment of the operating length at the rear of the tractor. This is done by simply moving the claws on the drawbar from one hole to another.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. An adjustable length drawbar for mounting on a vehicle, the drawbar having a coupling point which can be located at different positions and having a locking means for holding the drawbar in one of said positions, the locking means being operable automatically as the drawbar is moved lengthwise to its desired position, characterized by:
- a plurality of bores extending through the drawbar;
- an apertured claw;
- a pin for insertion through the claw and one of the bores to hold the claw to the drawbar, the claw being rotatably mounted on the pin;
- a spring biassed to urge the claw towards the drawbar; and
- a pair of tabs projecting from the claw on either side of the pin, the tabs being engagable with recesses which are fixed with respect to the vehicle.

2. The adjustable length drawbar of claim 1, characterized by:
- at least one recess fixed with respect to the vehicle;
- a locking member releasably engagable with the recess; and
- means for attaching the locking member at different positions on the drawbar.

3. The adjustable length drawbar of claim 1, characterized by:
- at least one recess fixed with respect to the vehicle; and
- at least one spring-loaded claw having a tab for engaging the recess when the drawbar is set at a desired position.

4. The adjustable length drawbar of claim 1, wherein: the claw has a tab which projects therefrom and towards the drawbar, the tab being engagable with a recess which is fixed with respect to the vehicle.

5. An adjustable length drawbar for mounting on a vehicle, the drawbar having a coupling point which can be located at different positions and having a locking means for holding the drawbar in one of said positions, the locking means being operable automatically as the drawbar is moved lengthwise to its desired position, characterized by:
- a cage attached to the vehicle, the drawbar being slidably received by the cage;
- a pair of recesses formed at a rear end of the cage; and
- a pair of ramp surfaces formed at the rear end of the cage adjacent to the recess, the locking means being slidable over the ramp surfaces and into engagement with the recesses, the ramp surfaces operating to spread apart the locking means upon movement of the drawbar.

6. The adjustable length drawbar of claim 5, wherein: the cage extends generally in the longitudinal direction of the vehicle and is pivotally coupled to the vehicle about a vertical pivot axis.

7. The adjustable length drawbar of claim 5, wherein:
- a recess is formed at the rear end of the cage and the locking means is engagable with the recess.

8. The adjustable length drawbar of claim 7, wherein: the recess extends generally laterally into a surface of the cage.

9. An adjustable length drawbar for mounting on a vehicle, the drawbar having a coupling point which can be located at different positions and having a locking means for holding the drawbar in one of said positions, the locking means being operable automatically as the drawbar is moved lengthwise to its desired position, characterized by:
- a cage attached to the vehicle, the drawbar being slidably received by the cage;
- a pair of recesses formed at the rear end of the cage; and
- a pair of shoulder surfaces formed at a rear end of the cage adjacent to the recess, the locking means being engagable with the shoulder surfaces.

10. An adjustable length drawbar for mounting on a vehicle, the drawbar having a coupling point which can be located at different positions and having a locking means for holding the drawbar in one of said positions, the locking means being operable automatically as the drawbar is moved lengthwise to its desired position, characterized by:
- a cage attached to the vehicle, the drawbar being slidably received by the cage, the cage comprising a pair of parallel extending brackets connected to each other by links, each bracket having a pair of recesses located opposite each other at the rear end of the brackets, the locking means being engagable with the recess.

* * * * *